United States Patent Office 3,419,591
Patented Dec. 31, 1968

1

3,419,591
SUBSTITUTED PHENETIDINE SALT OF HEXA-
FLUOROARSENIC AND HEXAFLUOROPHOS-
PHORIC ACIDS
Hugh T. Harrison, Tulsa, Okla., assignor to The Dow
Chemical Company, Midland, Mich., a corporation of
Delaware
No Drawing. Filed Feb. 16, 1966, Ser. No. 527,757
4 Claims. (Cl. 260—440)

The present invention is directed to substituted phenetidine salt compound of the formula

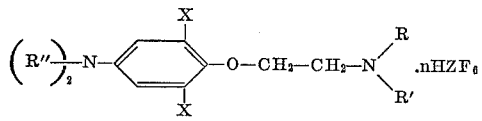

In the above and succeeding formulae, each X independently represents a member selected from the group consisting of chlorine, bromine, and iodine; R, taken singly, represents loweralkyl, R' taken singly, represents a member selected from the group consisting of hydrogen and lower-alkyl, and R and R', taken together, represent the divalent moiety $-(CH_2)_5$, which, with the nitrogen atom, comprises a piperidine ring; R'' represents a member selected from the group consisting of hydrogen and methyl; Z represents a member selected from the group consisting of arsenic and phosphorus; and $n$ represents an integer of from 1 to 2, both inclusive. In the present specification and claims, the term "loweralkyl" is employed to designate an alkyl radical being of from 1 to 4, both inclusive, carbon atoms.

The present compounds are crystalline solid materials, of low solubility in nonpolar organic solvents and of moderate solubility in water and polar organic solvents. They are useful as parasiticides for the control of a number of arachnid, insect, bacterial, fungal, and helminth organisms. The compounds are also useful as herbicides.

The salt compounds of the present invention are prepared by reacting the corresponding substituted phenetidine base of the formula

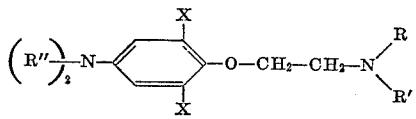

with hexafluoroarsenic or hexafluorophosphoric acid. Conveniently, the reaction is carried out in an inert liquid reaction medium, such as water. The reaction is exothermic and takes place smoothly at temperatures of from −10° to 80° C.; conveniently, the reaction is conducted at room temperature. Good results are obtained when the reactants are employed in amounts representing approximately equimolecular proportions of both reactants where $n$ is one, or in amounts representing one molecular proportion of phenetidine base and at least two molecular proportions of acid where $n$ is two.

The hexafluoroarsenic or hexafluorophosphoric acid reactant is usually employed as a liquid, conveniently, the commercial product which contains 65 percent $HAsF_6$, 21 percent $H_2O$, and 14 percent related arsensic acids, or the commercial product which contains 65 percent $HPF_6$, 21 percent $H_2O$, and 14 percent related phosphorus acids. In other procedures, a liquid containing one of the acids is prepared in the manner of Nuttall et al. in their preparation of an aqueous solution of hexafluorophosphoric

2 acid. See the Journal of the Chemical Society (London), 1960, pages 4965–4970. In yet other procedures, it is sometimes convenient to employ a solid hydrate form of one of the acids.

In carrying out the reaction, the penetidine base is contacted with one of the acids in any conventional manner, conveniently, by adding one reactant to the other reactant. The temperature of the resulting reaction mixture can be controlled by regulating the rate of the contacting of the reactants as well as by external cooling. Upon completion of the contacting of the reactants, most of the rection will have taken place with the production of the desired product. Where optimum yields are desired, it is often convenient that the reaction mixture be allowed to stand for several hours or longer. Upon completion of the reaction, solvent employed as inert liquid reaction medium can be removed from the reaction mixture by evaporation or distillation under subatmospheric pressure to obtain the salt product as a residue. This product residue can be further purified by conventional procedures such as washing with water or suitable organic liquid and recrystallization.

The products of the present invention are also prepared in an alternate procedure. In this procedure, a mineral acid salt of the phenetidine base is reacted with silver hexafluoroarsenate or silver hexafluorophosphate. The reaction is conveniently carried out in water or a loweralkanol as an inert liquid reaction medium. The preferred mineral acid salts of the phenetidine base are the hydhochloride, hydrobromide, hydriiodide, and sulfate salts. The reaction goes forward readily at temperatures of from −10° to 80° C.; conveniently, however, the reaction is conducted at room temperatures. The reaction results in the preparation of the desired product of the present invention and of a by-product silver salt of which the anion is the anion of the phenetidine base mineral acid salt starting material.

In carrying out the reaction, the reactants are contacted in any convenient manner, typically by adding one reactant in a quantity of reaction medium to the other reactant in a quantity of reaction medium. After the completion of the contacting of the reactants, the reaction mixture is preferably permitted to stand for a period of time to assure precipitation of the silver salt by-product. The by-product is then removed by filtration, and the reaction medium removed from the filtrate by evaporation to obtain the desired product.

The products of the present invention frequently exist as hydrates, a form which is without deleterious effect upon the practice of the present invention. However, when desired, water of hydration can be removed by conventional procedures such as treatment with a suitable reagent, such as 2,2-dimethoxypropane.

The following examples illustrate the best mode of the present invention and will enable those skilled in the art to practice the present invention.

Example 1.—3,5-dichloro-4-(2-(dimethylamino)ethoxy)-
aniline hexafluoroarsenate

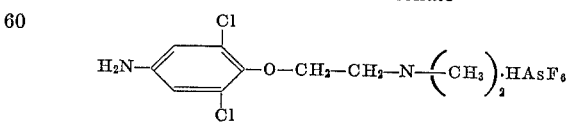

3,5 - dichloro - 4 - (2 - (dimethylamino)ethoxy)aniline dihydrochloride (3.0 gram; about 0.01 mole) was mixed with 100 milliliters of deionized water. The resulting mixture was put onto an ion exchange column containing 50 mesh size beads of a strong base anion exchange resin in the hydroxide form. Some of the starting material was observed to precipitate on the resin beads. The column was eluted with deionized water, the resulting eluted free base, 3,5 - dichloro - 4 - (2 - (dimethylamino)ethoxy)aniline, being permitted to drop into a solution comprising 5 grams of a commercially available solution of hexafluoroarsenic acid. This solution, comprising 65 percent of the acid, 21 percent water, and 14 percent related arsenic acids, represented 0.017 mole of the acid. All operations were carried out at room temperature.

As the eluant dropped into the acid solution, the desired 3,5 - dichloro - 4 - (2 - (dimethylamino)ethoxy)aniline hexafluoroarsenate product was observed to precipitate in the solution. The resulting solution was held for about three weeks under conditions conducive to evaporation of the water. The solution was then filtered to separate the product, the product washed with three 50-milliliter portions of diethyl ether at a temperature of about 0–50° C., and the filtrate and wash solution combined and concentrated to dryness to obtain an additional portion of product. The combined product melted, with decomposition, at 220–4° C.

Example 2.—3,5-dichloro-4-(2-(dimethylamino)ethoxy) aniline dihexafluorophosphate The procedure of Example 1 was followed employing as reactants 3,5-dichloro-4-(2-(dimethylamino)ethoxy) aniline dihydrochloride (2.8 gram; 0.0086 mole) and 5 grams of commercially available hexafluorophosphoric acid solution comprising about 65 percent acid, 21 percent water, and 14 percent related phosphorus acids. This represented 0.022 mole of the acid. No precipitation was noted immediately upon the dripping of the eluant into the acid solution; however, at the end of the approximately 3-week period, precipitation of the desired 3,5-dichloro-4-(2-(dimethylamino)ethoxy)aniline dihexafluorophosphate product had occurred. The product was separated by filtration as a crystalline solid melting, with decomposition, at 144–146° C.

Other representative products of the present invention include the following:

3,5 - dibromo - 4 - (2 - (dimethylamino)ethoxy) - N,N-dimethylaniline hexafluorophosphate, having a molecular weight of 512.1.

3,5 - dibromo - 4 - (2 - (n - butylamino)ethoxy) - N,N-dimethylaniline hexafluoroarsenate, having a molecular weight of 584.1.

3,5 - dichloro - 4 - (2 - (dimethylamino)ethoxy)aniline dihexafluorophosphate, having a molecular weight of 54.1.

3,5 - dichloro - 4 - (2 - (dimethylamino)ethoxy)aniline dihexafluoroarsenate, having a molecular weight of 466.1.

3,5-dibromo-4-(2-piperidinoethoxy)aniline hexafluorophosphate, having a molecular weight of 524.1.

3,5-diiodo-4-(2-(dimethylamino)ethoxy)aniline dihexafluoroarsenate, having a molecular weight of 812.

3 - bromo - 5 - chloro - 4 - (2 - (di - n - propylamino)ethoxy)-N,N-dimethylaniline hexafluorophosphate, having a molecular weight of 524.

When one of the present compounds is employed as a parasiticide, the unmodified compound can be employed. However, the present invention also encompasses the use of a compound of the present invention together with a parasiticide adjuvant. In such use, the compound can be dispersed upon a finely divided solid and the resulting preparation employed as a dust. Also, such a preparation can be dispersed in water with the aid of a wetting agent and the resulting aqueous suspension employed as a spray. In other procedures, a product according to the present invention can be employed as a constituent of organic liquid compositions, oil-in-water or water-in-oil emulsions, or water dispersions, with or without the addition of wetting, dispersing, or emulsifying agents. In representative operations, 3,5-dichloro-4-(2-(dimethylamino)ethoxy)aniline hexafluoroarsenate gave 100 percent kill and control of nymphs of lone star tick (*Amblyomma americanum*) which were wetted briefly with an aqueous composition comprising 500 parts of the compound per million parts by weight of ultimate composition.

The substituted phenetidine base which is to be employed as starting material in the synthesis of the products of the present invention and which is of the formula:

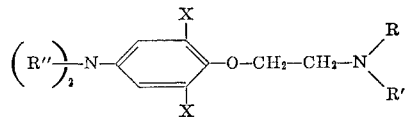

is prepared as the result of a reaction sequence having several steps. Where R″ represents hydrogen, the reaction sequence is substantially as follows:

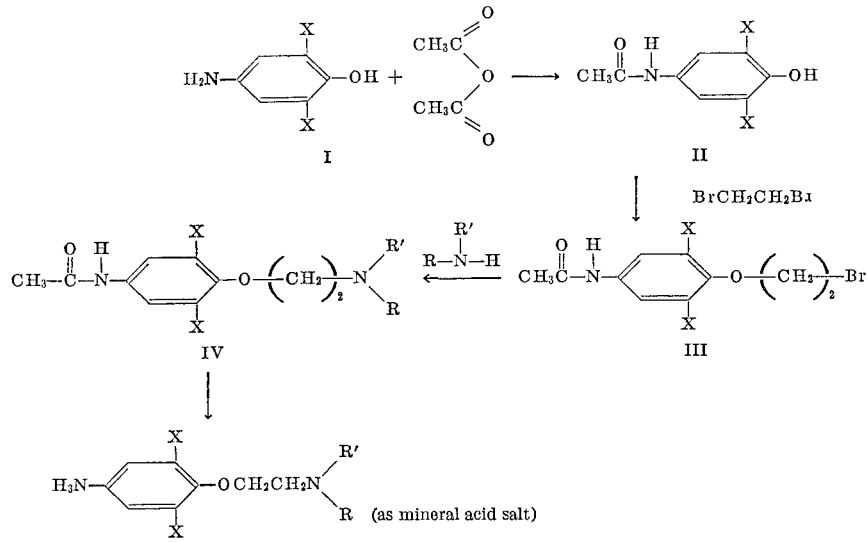

More specifically, a 3,5-dihalo-4-hydroxyaniline (I) is reacted with acetic anhydride to produce the corresponding 3′,5′-dihalo-4′-hydroxyacetanilide (II). In carrying out this reaction, about one molar proportion of the 3,5-dihalo-4-hydroxyaniline is suspended in water containing about 10 per cent of acetic acid and maintained at a temperature of from about 25° to 30° C. with stirring, while about two molar proportions of acetic anhydride are added thereto dropwise. After about three hours of stirring of the reaction mixture, the latter is neutralized to about pH 6 with aqueous sodium hydroxide solution and the resulting mixture stirred for an additional hour. The desired 3′,5′-dihalo-4′-hydroxyacetanilide precipitates from the reaction mixture and is separated by filtration and washed with water.

The 4′-(2-bromoethoxy)-3′,5′-dihaloacetanilides (III) are prepared by reacting the corresponding 3′,5′-dihalo-4′-hydroxyacetanilides (II) with ethylene dibromide in an aqueous medium containing a hydrogen bromide acceptor such as an alkali metal hydroxide or carbonate. In a preferred method, the dihalo-4′-hydroxyacetanilide is reacted with the ethylene dibromide in an organic solvent, such as acetone, employing an alkali metal carbonate, such as potassium carbonate, as the hydrogen bromide acceptor. In such operations, it is desirable to employ an access of ethylene dibromide and good results have been obtained when employing from 3 to 5 moles or more of ethylene dibromide per mole of dihalo-4′-hydroxyacetanilide in the reaction.

The β-bromoethoxy compounds (III) are next reacted with a lower alkyl primary or secondary amine in a suitable solvent such as a lower alkanol to produce the corresponding 4′-(5-mono-or dialkylaminoethoxy)-3′,-5′-dihaloacetanilide (IV). The latter is readily hydrolyzed by heating with an aqueous mineral acid to produce the (β-alkylaminoethoxy)dihaloanilines as their mineral acid salts. To obtain these in the free-base form, a mineral acid salt such as the hydrochloride is dispersed in water and the resulting mixture is made alkaline with a strong base, such as sodium hydroxide, and extracted with a water-immiscible, inert organic solvent such as methylene chloride, chloroform or the like. By this procedure, the free-base form of the desired compound is extracted into the organic layer which may then be separated and evaporated to obtain the desired compound. In addition, the free-base form is also conveniently obtained by running an aqueous solution of the mineral acid salt through an ion exchange column of a strong base anion exchange resin in the hydroxide form.

The substituted phenetidine base wherein R″ represents methyl is readily prepared by a series of reactions similar to the foregoing except that the initial acetylation reaction and final hydrolysis reaction are not required. Thus, a 2,6-dihalo-4-(dimethylamino)phenol is reacted with a molar excess of ethylene dibromide in the presence of a hydrogen bromide acceptor to produce a 4-(β-bromoethoxy)-3,5-dihalo - N,N - dimethylaniline and the latter is reacted in a suitable solvent with a mono-alkyl or dialkyl amine to produce the desired phenetidine base wherein R″ represents methyl.

I claim:
1. Compound of the formula

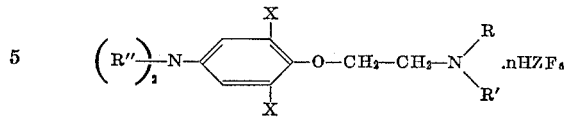

wherein each X independently represents chlorine, bromine, or iodine; R, taken singly, represents loweralkyl, R′, taken singly, represents hydrogen or loweralkyl, and R and R′, taken together, represent the divalent moiety $-(CH_2)_5-$, which, with the nitrogen atom, comprises a piperidine ring; R″ represents hydrogen or methyl; Z represents arsenic or phosphorus; and n represents an integer of from 1 to 2, both inclusive.

2. Compound of claim 1 wherein each X represents chlorine; each of R and R′ represents methyl; R″ represents hydrogen; Z represents arsenic and n represents one; corresponding to 3,5-dichloro-4-(2-(dimethylamino)ethoxy)aniline hexafluoroarsenate.

3. Compound of claim 1 wherein each X represents chlorine; each of R and R′ represents methyl; R″ represents hydrogen; Z represents phosphorus; and n represents one; corresponding to 3,5-dichloro-4-(2-(dimethylamino)ethoxy)aniline hexafluorophosphate.

4. Compound of claim 1 wherein each X represents chlorine; each of R and R′ represents methyl; R″ represents hydrogen; Z represents phosphorus; and n represents two; corresponding to 3,5-dichloro-4-(2-(dimethylamino)ethoxy)aniline dihexafluorophosphate.

References Cited
UNITED STATES PATENTS

| | | | |
|---|---|---|---|
| 3,152,160 | 10/1964 | Harrison | 260—440 |
| 3,132,166 | 5/1964 | Harrison | 260—440 |
| 3,133,106 | 5/1964 | Harrison | 260—440 |
| 3,133,107 | 5/1964 | Harrison | 260—440 |
| 3,189,428 | 6/1965 | Mussell | 260—440 X |
| 3,328,444 | 6/1967 | Harrison | 260—440 |
| 3,328,445 | 6/1967 | Harrison | 260—440 |
| 3,338,939 | 8/1967 | Harrison | 260—440 |
| 3,338,940 | 8/1967 | Harrison | 260—440 |

TOBIAS E. LEVOW, *Primary Examiner.*

W. F. W. BELLAMY, *Assistant Examiner.*

U.S. Cl. X.R.

71—81, 83, 86, 97; 167—31, 33; 260—270, 570.7